(12) United States Patent
Khinchuk

(10) Patent No.: US 10,453,428 B2
(45) Date of Patent: Oct. 22, 2019

(54) SPORTING EVENT DISPLAY DEVICE SYSTEM

(71) Applicant: Contour Design, Inc., Windham, NH (US)

(72) Inventor: Anton Khinchuk, Burlington, MA (US)

(73) Assignee: CONTOUR DESIGN, INC., Windham, NH (US)

( * ) Notice: Subject to any disclaimer, the term of this patent is extended or adjusted under 35 U.S.C. 154(b) by 225 days.

(21) Appl. No.: 15/189,261

(22) Filed: Jun. 22, 2016

(65) Prior Publication Data

US 2016/0372086 A1    Dec. 22, 2016

Related U.S. Application Data

(60) Provisional application No. 62/298,727, filed on Feb. 23, 2016, provisional application No. 62/182,707, filed on Jun. 22, 2015.

(51) Int. Cl.

| | |
|---|---|
| *G06F 3/048* | (2013.01) |
| *G09G 5/377* | (2006.01) |
| *A63B 71/06* | (2006.01) |
| *G06F 3/0482* | (2013.01) |
| *G06F 3/0484* | (2013.01) |
| *G09G 5/14* | (2006.01) |
| *G06Q 30/02* | (2012.01) |
| *G06Q 50/00* | (2012.01) |
| *G06Q 50/34* | (2012.01) |
| *G09G 5/00* | (2006.01) |

(52) U.S. Cl.
CPC ............ *G09G 5/377* (2013.01); *A63B 71/06* (2013.01); *G06F 3/0482* (2013.01); *G06F 3/04847* (2013.01); *G06Q 30/0241* (2013.01); *G06Q 50/01* (2013.01); *G06Q 50/34* (2013.01); *G09G 5/14* (2013.01); *G09G 5/00* (2013.01); *G09G 2320/10* (2013.01); *G09G 2340/12* (2013.01); *G09G 2340/145* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 5,860,862 | A | 1/1999 | Junkin |
| 6,193,610 | B1 | 2/2001 | Junkin |
| 6,394,899 | B1 | 5/2002 | Walker |
| 6,840,861 | B2 | 1/2005 | Jordan et al. |

(Continued)

*Primary Examiner* — William C Trapanese
(74) *Attorney, Agent, or Firm* — Lando & Anastasi, LLP

(57) ABSTRACT

A method optimizes the visible area of a display device during a sporting event having a plurality of activities, where each activity ultimately has an outcome. To that end, the method receives a stream of electronic, machine readable real-time event information relating to the sporting event. When receiving the stream (i.e., at least part of the time when receiving the stream), the method displays, in real time on the display device, an event user interface having selection indicia configured to enable a user to predict the outcome of at least one of the plurality of activities of the event in real time. In response to user input via the event user interface, the method displays message indicia over at least a portion of the interface.

30 Claims, 8 Drawing Sheets

(56) References Cited

U.S. PATENT DOCUMENTS

| | | |
|---|---|---|
| 6,884,166 B2 | 4/2005 | Leen et al. |
| 6,899,628 B2 | 5/2005 | Leen et al. |
| 7,029,394 B2 | 4/2006 | Leen et al. |
| 7,534,169 B2 | 5/2009 | Amaitis et al. |
| 8,342,924 B2 | 1/2013 | Leen et al. |
| 8,622,798 B2 | 1/2014 | Lockton et al. |
| 8,638,517 B2 | 1/2014 | Lockton et al. |
| 8,641,511 B2 | 2/2014 | Ginsberg et al. |
| 8,659,848 B2 | 2/2014 | Lockton et al. |
| 8,699,168 B2 | 4/2014 | Lockton et al. |
| 8,705,195 B2 | 4/2014 | Lockton |
| 8,717,701 B2 | 5/2014 | Lockton et al. |
| 8,737,004 B2 | 5/2014 | Lockton et al. |
| 8,780,482 B2 | 7/2014 | Lockton et al. |
| 8,817,408 B2 | 8/2014 | Lockton et al. |
| 8,837,072 B2 | 9/2014 | Lockton et al. |
| 8,870,639 B2 | 10/2014 | Lockton et al. |
| 8,935,715 B2 | 1/2015 | Cibula et al. |
| 9,056,251 B2 | 6/2015 | Lockton |
| 9,067,143 B2 | 6/2015 | Lockton et al. |
| 9,111,417 B2 | 8/2015 | Leen et al. |
| 9,205,339 B2 | 12/2015 | Cibula et al. |
| 9,233,293 B2 | 1/2016 | Lockton |
| 9,258,601 B2 | 2/2016 | Lockton et al. |
| 9,270,789 B2 | 2/2016 | Huske |
| 9,314,686 B2 | 4/2016 | Lockton |
| 9,314,701 B2 | 4/2016 | Lockton et al. |
| 9,457,272 B2 | 10/2016 | Lockton et al. |
| 9,498,724 B2 | 11/2016 | Lockton et al. |
| 9,501,904 B2 | 11/2016 | Lockton |
| 9,504,922 B2 | 11/2016 | Lockton et al. |
| 9,526,991 B2 | 12/2016 | Lockton et al. |
| 9,604,140 B2 | 3/2017 | Lockton et al. |
| 9,652,937 B2 | 5/2017 | Lockton |
| 9,662,576 B2 | 5/2017 | Lockton et al. |
| 9,662,577 B2 | 5/2017 | Lockton et al. |
| 9,672,692 B2 | 6/2017 | Lockton |
| 9,687,738 B2 | 6/2017 | Lockton et al. |
| 9,687,739 B2 | 6/2017 | Lockton et al. |
| 9,707,482 B2 | 7/2017 | Lockton et al. |
| 9,716,918 B1 | 7/2017 | Lockton et al. |
| 9,724,603 B2 | 8/2017 | Lockton et al. |
| 9,744,453 B2 | 8/2017 | Lockton et al. |
| 9,821,233 B2 | 11/2017 | Lockton et al. |
| 9,878,243 B2 | 1/2018 | Lockton et al. |
| 9,901,820 B2 | 2/2018 | Lockton et al. |
| 9,908,053 B2 | 3/2018 | Lockton et al. |
| 9,919,210 B2 | 3/2018 | Lockton |
| 9,919,211 B2 | 3/2018 | Lockton et al. |
| 9,919,221 B2 | 3/2018 | Lockton et al. |
| 2005/0227757 A1 | 10/2005 | Simon |
| 2008/0059571 A1 | 3/2008 | Khoo |
| 2011/0028203 A1* | 2/2011 | Agarwal ............ G07F 17/3211 463/20 |
| 2012/0214575 A1* | 8/2012 | Amaitis ................ G06Q 50/34 463/25 |
| 2013/0225285 A1 | 8/2013 | Lookton |
| 2014/0018156 A1* | 1/2014 | Rizzotti ................ A63F 13/12 463/25 |
| 2016/0054872 A1 | 2/2016 | Cibula et al. |
| 2016/0134947 A1 | 5/2016 | Huske et al. |
| 2016/0300433 A1 | 10/2016 | Ortiz et al. |
| 2017/0001115 A1 | 1/2017 | Melinger et al. |
| 2017/0036110 A1 | 2/2017 | Lockton et al. |
| 2017/0053498 A1 | 2/2017 | Lockton |
| 2017/0221314 A1 | 8/2017 | Locton |
| 2017/0225071 A1 | 8/2017 | Lockton et al. |
| 2017/0252649 A1 | 9/2017 | Lockton et al. |
| 2017/0264961 A1 | 9/2017 | Lockton |
| 2017/0282067 A1 | 10/2017 | Lockton et al. |
| 2017/0296916 A1 | 10/2017 | Lockton et al. |
| 2017/0358173 A1 | 12/2017 | McCafferty |
| 2018/0025586 A1 | 1/2018 | Lockton |
| 2018/0104582 A1 | 4/2018 | Lockton et al. |
| 2018/0104596 A1 | 4/2018 | Lockton et al. |
| 2018/0117464 A1 | 5/2018 | Lockton et al. |

* cited by examiner

28

29

SPORTING EVENT DISPLAY DEVICE SYSTEM

PRIORITY

This patent application claims priority from provisional U.S. patent application No. 62/182,707, filed Jun. 22, 2015, and naming Anton Khinchuk as inventor, the disclosure of which is incorporated herein, in its entirety, by reference.

This patent application also claims priority from provisional U.S. patent application No. 62/298,727, filed Feb. 23, 2016, and naming Anton Khinchuk as inventor, the disclosure of which is incorporated herein, in its entirety, by reference.

RELATED APPLICATION

This patent application is related to U.S. patent application Ser. No. 15/189,272, entitled, "Sporting Event Display Management System," filed on Jun. 22, 2016, the disclosure of which is incorporated herein, in its entirety, by reference.

FIELD OF THE INVENTION

Illustrative embodiments of the invention generally relate to operator interfaces on display devices and, more particularly, illustrative embodiments relate to providing a specific element in an interface with which a user can interact during an event.

BACKGROUND OF THE INVENTION

By their very nature, display devices have a limited amount of real estate for displaying graphical information. This problem becomes more acute with smaller computing devices, such as mobile computers (e.g., laptops and smartphones). For example, a smartphone may display messages from sponsors of an application it is executing (also referred to as an "app"), as well as the graphical information of the app itself (e.g., a game or map). To that end, prior art devices often overlay a message banner, such as an advertisement, directly over the graphical information of the app. Undesirably, this can partly obscure the graphical information of the app, as well as further reduce the limited screen space.

SUMMARY OF VARIOUS EMBODIMENTS

In accordance with one embodiment of the invention, a method optimizes the visible area of a display device during a sporting event having a plurality of activities, where each activity ultimately has an outcome. To that end, the method receives a stream of electronic, machine readable real-time event information relating to the sporting event. When receiving the stream (i.e., at least part of the time when receiving the stream), the method displays, in real time on the display device, an event user interface having selection indicia configured to enable a user to predict the outcome of at least one of the plurality of activities of the event in real time.

The method then receives a user selection of the selection indicia predicting the outcome of a given activity of the sporting event. The given activity has a duration, and the user selection is received before the completion of the given activity as defined by the received stream of real-time event information. In response to receipt of the user selection, the method displays, on the display device in real time during the given activity, message indicia over at least a portion of the event user interface for a time period. The message indicia effectively cover at least the portion of the event user interface. The time period for displaying the message is determined as a function of the duration remaining of the given activity after receiving the user selection. In a similar manner, the duration is a function of the received stream of real-time event information. The method then controls the display to no longer display the message indicia over at least the portion of the event user interface as a function of the duration of the given activity.

The message indicia may be considered to be in the foreground of the display device when displayed over at least the portion of the event user interface. In that case, the method also may display the message indicia in the background a) before receiving the user selection, and/or b) after controlling the display device not to display the message indicia over at least the portion of the event user interface. Moreover, the display device may include a mobile device, such as a tablet or a smartphone.

Among other things, the sporting event may be a football game or a baseball game. For example, when a baseball game, the given activity may be an at-bat of a player of the baseball game. To increase the likelihood of the user viewing the message, the method may ensure that the user has no interface (or other means) to remove the message indicia from the display when the message indicia is displayed to cover at least the portion of the event user interface. As such, the message may be considered "locked" on top of the event user interface.

The stream of real-time event information may be received live or delayed by no more than about 45 seconds from live. The message indicia may cover the event user interface for different amounts of time. For example, the message indicia may cover the event user interface for the entire remaining duration of the given activity remaining after receiving the user selection.

As with various similar devices, the display device has a plurality of display regions. The event user interface preferably is one of the plurality of display regions. In that case, the message indicia may cover no display region other than the portion of the event user interface. In other words, the message indicia may not extend beyond the event user interface.

In accordance with another embodiment of the invention, a sporting event display system effectively optimizes the visible area of a display device during a sporting event having a plurality of activities. To that end, the event display system has an input to receive input information. Among other things, the input information includes a stream of electronic, machine readable real-time event information relating to the sporting event. The system also has a display operatively coupled with the input. The display is configured to display, in real time (when the input is receiving the stream of real-time event information), an event user interface having selection indicia. Like various other embodiments, the selection indicia are configured to enable a user to predict the outcome of at least one of the plurality of activities of the sporting event in real time.

The input information also includes a user selection of the selection indicia predicting the outcome of a given activity of the sporting event. The given activity has a duration, and the user selection is received before the completion of the given activity as defined by the received stream of real-time event information. In addition, the system also has a message controller operatively coupled with the display. The message controller is configured to control the display to display message indicia in real time during the given activity and after receiving the user selection. The message controller causes the message indicia to cover at least a portion of the event user interface for a time period, where the time period is a function of the duration remaining of the given activity after receiving the user selection. The duration is a function of the received stream of real-time event information. The message controller is further configured to control the message indicia to no longer display the message indicia over at least the portion of the event user interface as a function of the duration of the given activity.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a display system apparatus and method ("display system") optimizes screen space to ensure that a message in a sporting event application will be more readily viewed by a person using the application. To that end, the display system may display the message over an event user interface of the application for some prescribed duration of a specific activity in the event. For example, if the sporting event is a baseball game, then the message may be displayed over the event user interface during the at-bats(s) of one or more of the players (i.e., the activity is the at-bat). Thus, for some duration of this at-bat, the message is in the foreground of the screen, covering at least a part of the event user interface. Importantly, the user preferably cannot remove the message from this foreground position of the screen space.

After a certain period, however, the display system may remove the message from its foreground position. For example, the display system may completely remove the message from the screen, or move the message to the background of the event user interface. Details of illustrative embodiments are discussed below.

Figure 1:
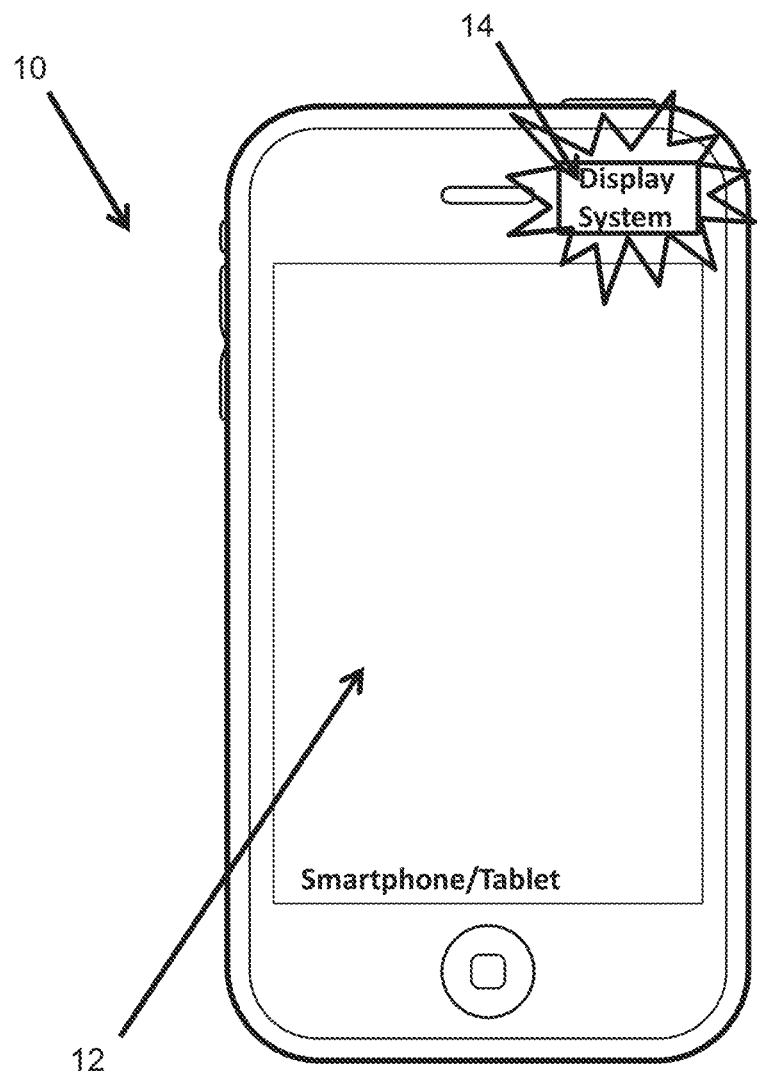
FIG. 1 schematically shows a computer device that may implement illustrative embodiments of the invention.

FIG. 1 schematically shows a computing device 10 that may implement illustrative embodiments of the invention. Specifically, the computing device 10 in this embodiment is a smartphone or tablet (also referred to in this description using reference number "10"). For example, among other similar devices, the smartphone 10 may be an IPHONE™, while the tablet 10 may be an IPAD™ Both of these computing devices 10 are distributed by Apple Inc., of Cupertino, Calif.

As with these and other similar computing devices 10, screen space is at a premium. Specifically, even a reasonably large currently available smartphone 10 may have a screen 12 (also referred to as a "display") that is only about 4 inches high and 2.3 inches wide. This limited area of screen space thus displays only a correspondingly small amount of visual indicia to the user. Accordingly, use of the available screen space is limited. This technical problem consequently can degrade the user experience, as well as reduce revenue generating advertising opportunities.

For example, many applications running on smartphones 10 often receive much of their revenue through paid advertisements. These paid advertisements, however, often are in the form of banner ads that cover a significant portion of the screen space. At a minimum, these banner ads at least reduce the amount of space available for displaying visual indicia of the underlying application. While it is a widely accepted practice, those skilled in the art typically avoid covering important application control indicia (e.g., a user interface having buttons, controlling fields, etc.) when possible. Unfortunately, this pervasive practice continues because of the limited number of alternatives.

The inventors discovered, however, that some applications may have certain time periods where the application can sacrifice a portion of the screen space without adversely impacting the user experience. Using that realization, the inventors selectively display an opaque message in the foreground of the screen space, covering part of the application indicia, at those times when the application can withstand such an interruption. Accordingly, when the application needs that covered screen space back, the message is either moved to the background (e.g., may be come transparent or translucent to some extent), or removed entirely. Illustrative embodiments time the message display as a function of an underlying sporting event, which drives the event application—i.e., the event application is synchronized with the real-time sporting event.

Figure 2:
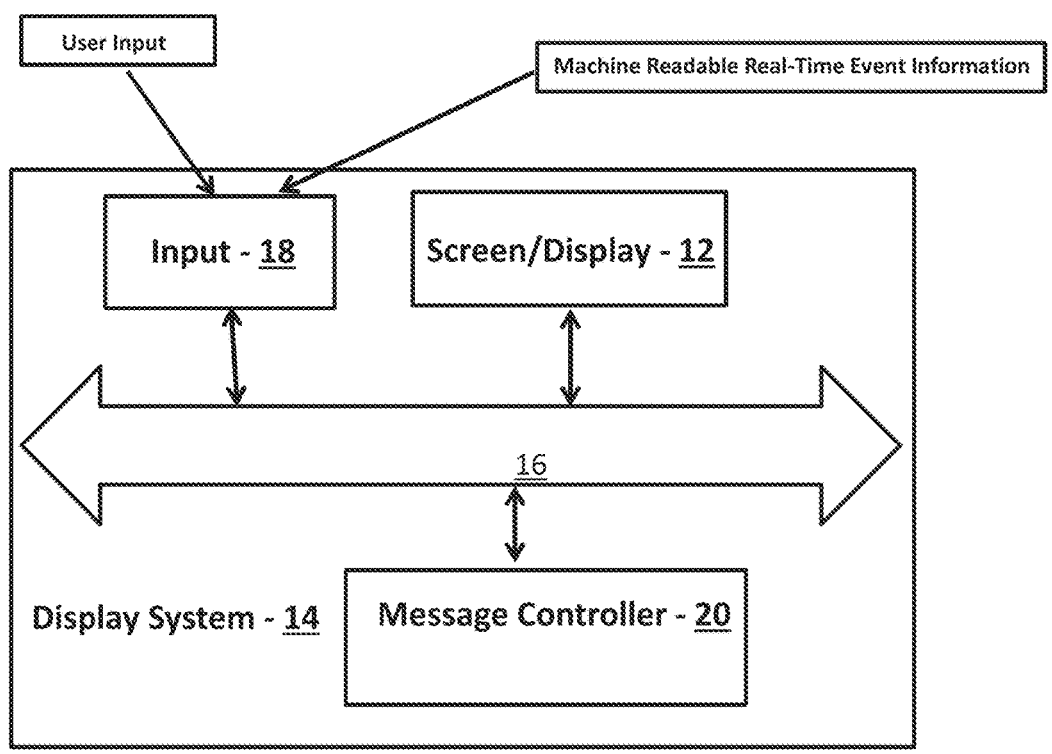
FIG. 2 schematically shows a display control system of the computer device of FIG. 1 configured in accordance with illustrative embodiments of the invention.

To implement this functionality, the smartphone 10 has a display system 14, shown generally in FIG. 1, and schematically in more detail in FIG. 2. Specifically, FIG. 2 schematically shows a block diagram of the display system 14, which may control the screen 12 of the smartphone 10, tablet 10, or other computing device 10 with limited screen space (e.g., a desktop computing device 10). The display system 14 may be part of the noted event application executing on the computing device 10, an independent processing module on the computing device 10, part of the computing device 10 itself, or shared between some or all of those entities.

Each of the components of the display system 14 is operatively connected by a conventional interconnect mechanism. FIG. 2 simply shows a bus 16 communicating each the components. Those skilled in the art should understand that this generalized representation can be modified to include other conventional direct or indirect connections. Accordingly, discussion of the bus 16 is not intended to limit various embodiments.

Indeed, it should be noted that FIG. 2 only schematically shows each of the components of the display system 14. Those skilled in the art should understand that each of these components can be implemented in a variety of conventional manners, such as by using hardware, software, or a combination of hardware and software, across one or more other functional components. For example, the below discussed message controller 20 may be implemented using a plurality of microprocessors executing firmware or application software. As another example, the message controller 20 may be implemented using one or more application specific integrated circuits (i.e., "ASICs") and related software, or a combination of ASICs, discrete electronic components (e.g., transistors), and microprocessors. Accordingly, the representation of the message controller 20 and other components in a single box of FIG. 2 is for simplicity purposes only. In fact, in some embodiments, the message controller 20 of FIG. 2 is distributed across a plurality of different devices—for example, within multiple integrated circuits or devices (e.g., some of it executed from a component across a wireless connection).

It should be reiterated that the representation of FIG. 2 is a significantly simplified representation of an actual display system 14. Those skilled in the art should understand that such a device may have other physical and functional components, such as central processing units and memory. Accordingly, this discussion is in no way intended to suggest that FIG. 2 represents all of the elements of a display system 14.

The display system 14 thus has an input 18 for receiving information from any of a variety of sources. The input 18 physically may be a single port, or a plurality of ports. Moreover, among other things, the input sources may include input data from a user interacting with a user interface of either the application or the device itself. For example, the user interface may include a graphical user interface, an accelerometer in the smartphone 10, or a microphone in the smartphone 10. The input 18 also preferably receives machine-readable, real time event information relating to an event. As discussed below, the application executes based on this real time event information.

Specifically, as discussed in greater detail below, illustrative embodiments are implemented as part of a sporting event application that enables a user to predict the outcomes of certain activities within the sporting event. The machine-readable, real time event information therefore preferably includes real time information relating to the sporting event itself. For example, that information may include the time left in a football game, or the pace and leaders an automobile race (e.g., a NASCAR™ race). As a further example, if used for a baseball event application, that information may include a real-time information feed relating to the game in progress, such as (among other things) the number of balls and strikes of a player/batter during an at-bat in a baseball game, the number of outs, the score, the inning, names of players up to bat and on base, player statistics, the outcome of an at-bat (e.g., if the player made an out or got a hit), and the bases having a baserunner, and the receipt of each pitch.

The display system 14 also may be considered to include the prior noted screen 12, such as a high definition liquid crystal display screen, and a message controller 20 that controls display of messages on the screen 12. The message controller 20 may display specific messages on the screen 12 based upon one or both of the two noted sources of information received at the input 18.

Figure 3:
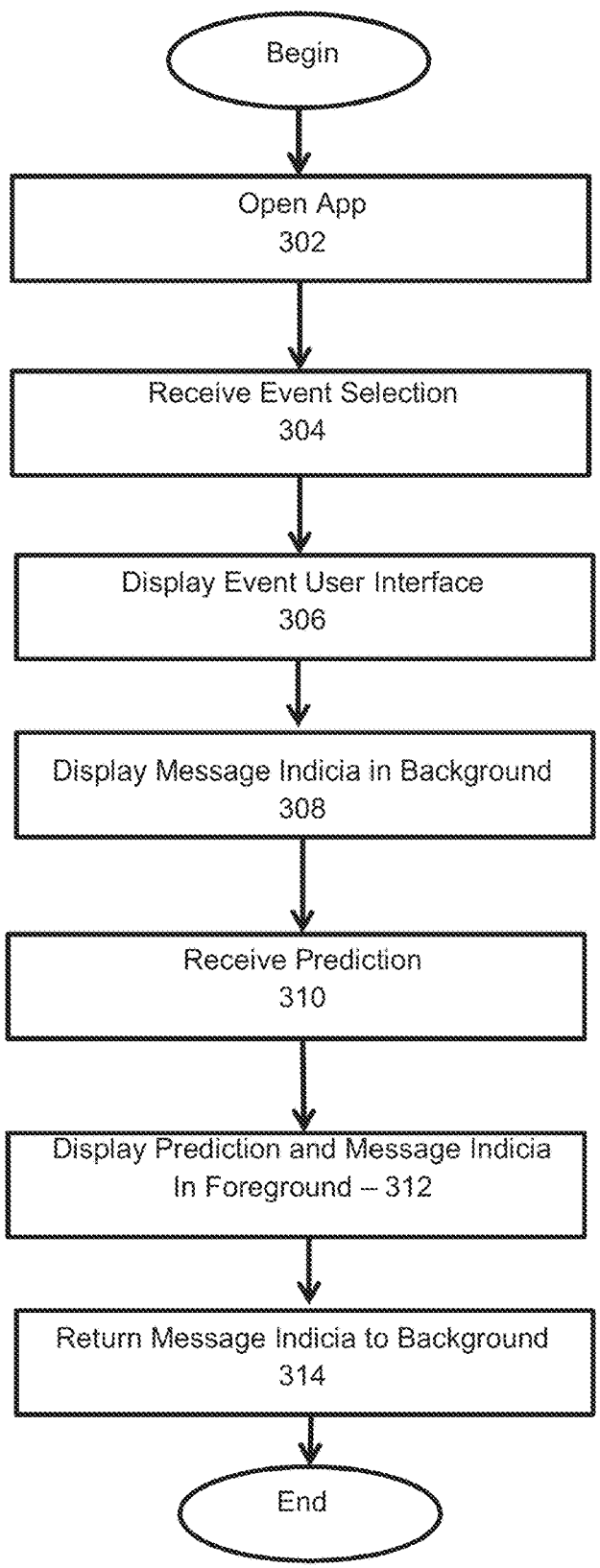
FIG. 3 shows a process of using an event application and the operation of the display control system of FIG. 2 in accordance with illustrative embodiments of the invention.

FIG. 3 shows a process of using the above noted event application (also known in the art as an "app") and the operation of the display control system of FIG. 2 in accordance with illustrative embodiments of the invention. It should be noted that this process is simplified from a longer process that likely would be used to intelligently display a message using the event application. Accordingly, this process of using the event application can have additional steps, such as other processing or data retrieval steps, which those skilled in the art likely would use. In addition, some of the steps may be performed in a different order than that shown, or at the same time. Those skilled in the art therefore can modify the process as appropriate.

The process of FIG. 3 begins at step 302, in which a user opens the event application. In illustrative embodiments, the event application enables a user to predict the outcome of certain activities within a sporting event, in real time, before those activities are completed. For example, if the sporting event is a baseball game, the user may predict whether a given player, before or at the time that player is up to bat (i.e., not after the at-bat), will get a hit, walk, or out during his/her at-bat. In illustrative embodiments, rather than just predicting whether the player will get a hit, the user predicts the type of hit, such as a single, a double, triple, or a home run.

The event application preferably assigns points to each possible designated outcome, and uses a formula to arrive at a total score for the user at the end of the game. To encourage more risky predictions, outcomes that are less likely may be assigned higher point values than those with lower possible outcomes. For example, the successful prediction that a player may make an out, which is quite common, may be worth only 5 points, while the successful prediction that a player may hit a triple, which is quite uncommon, may be worth 40 points. Varying the points in this manner encourages users to make riskier predictions to yield potentially higher point totals.

The event application may be used simultaneously by a plurality of different users that are competing to obtain the highest point total at the end of the game. In that case, the user with the highest point total at the end of the game may receive some recognition or award, such as a gift card from a sponsor, their name on the scoreboard during the next game, or simply the satisfaction of having the highest point total. Accordingly, in that case, the event application has a social aspect to it, enabling different uses to collaborate and compete. Alternatively, some users may simply prefer to use the event application without this social aspect, instead just using it by themselves.

Some embodiments permit the user to accumulate points across multiple games. For example, a user may accumulate 150 points across four different games. In fact, the user need not use the event application for entire games. Instead, the user may play partial games, such as by using it for only one at-bat, or for several at-bats in a given game. The example of 150 accumulated points thus may have been generated by the user playing/engaging during one entire game, and only a few at-bats in three other games. A sponsor or host of the event application may enable the user to apply accumulated points to receive some benefit, such as those discussed above (e.g., a gift card from a sponsoring company). This should incentivize the user to continue playing the game to receive further benefits.

As noted below, the user preferably uses the event application, and the event application executes, as a function of the real time of the game. For example, the user preferably uses the event application during the actual time that the event occurs. Indeed, there may be small variations to this theme. Specifically, as is common in modern sporting events, there may be a delay for a television or radio broadcast of the event by some prescribed period of time, such as 10-45 seconds. In that case, the event application may (or may not) execute with a corresponding delay (e.g., the same delay) and, in some embodiments, still be considered "real time." For example, the GPS functionality of the smartphone 10 may recognize that a user is watching the game in the stadium and thus, ensure that the event application executes using the actual time of the game. Accordingly, in this case, the event application is synchronized to the actual play timing of the underlying game. In a corresponding manner, the GPS functionality of the smartphone 10 may recognize that a person is not at the stadium. In that case, the event application may program in some delay from the real-time live play, such as 10 seconds. In this manner, the event application is synchronized to the timing of the game on the television. Accordingly, illustrative embodiments synchronize the event application with the event based on the potential means the user has to view the event. It should be noted, however, that the user may use the event application without viewing the event at all.

This real-time aspect has a number of benefits. For example, it engages fans/users watching a game when there is some down time during at-bats. Specifically, major-league baseball officials have indicated that fans undesirably tend to become bored during long at-bats for a number of reasons. The event application therefore engages the fan/user, hopefully eliminating this pervasive problem.

In alternative embodiments, the event may be recorded and played back well after the actual date of the event. In that case, the event application may be synchronized to the timing of the recorded version of the event and thus, still be considered to be operating in real time from the perspective of the event application, but not live real-time, such as discussed above. Such an embodiment may have less appeal because some users may already have seen the event and thus, have some knowledge of the outcomes of the activities. However, this alternative embodiment may have some appeal to people attempting to demonstrate their knowledge of a specific event that took place in the past.

For simplicity, illustrative embodiments are discussed using baseball as an example of the sporting event. Those skilled in the art, however, should recognize that the event application can be used with a wide variety of different types of events. For example, among other sporting events, the event application can be used with football, hockey, soccer, basketball, horse racing, Olympic events, track and field, cricket, auto racing, skiing, swimming races, martial arts (e.g., karate, judo, tae kwon do), tennis, golf, badminton, gymnastics, volleyball, wrestling, boxing, bodybuilding competitions, powerlifting competitions, boat racing, rugby, softball, table tennis, track and field, and surfing competitions. Accordingly, discussion of the event application with baseball should not limit various embodiments of the invention.

Figure 4:
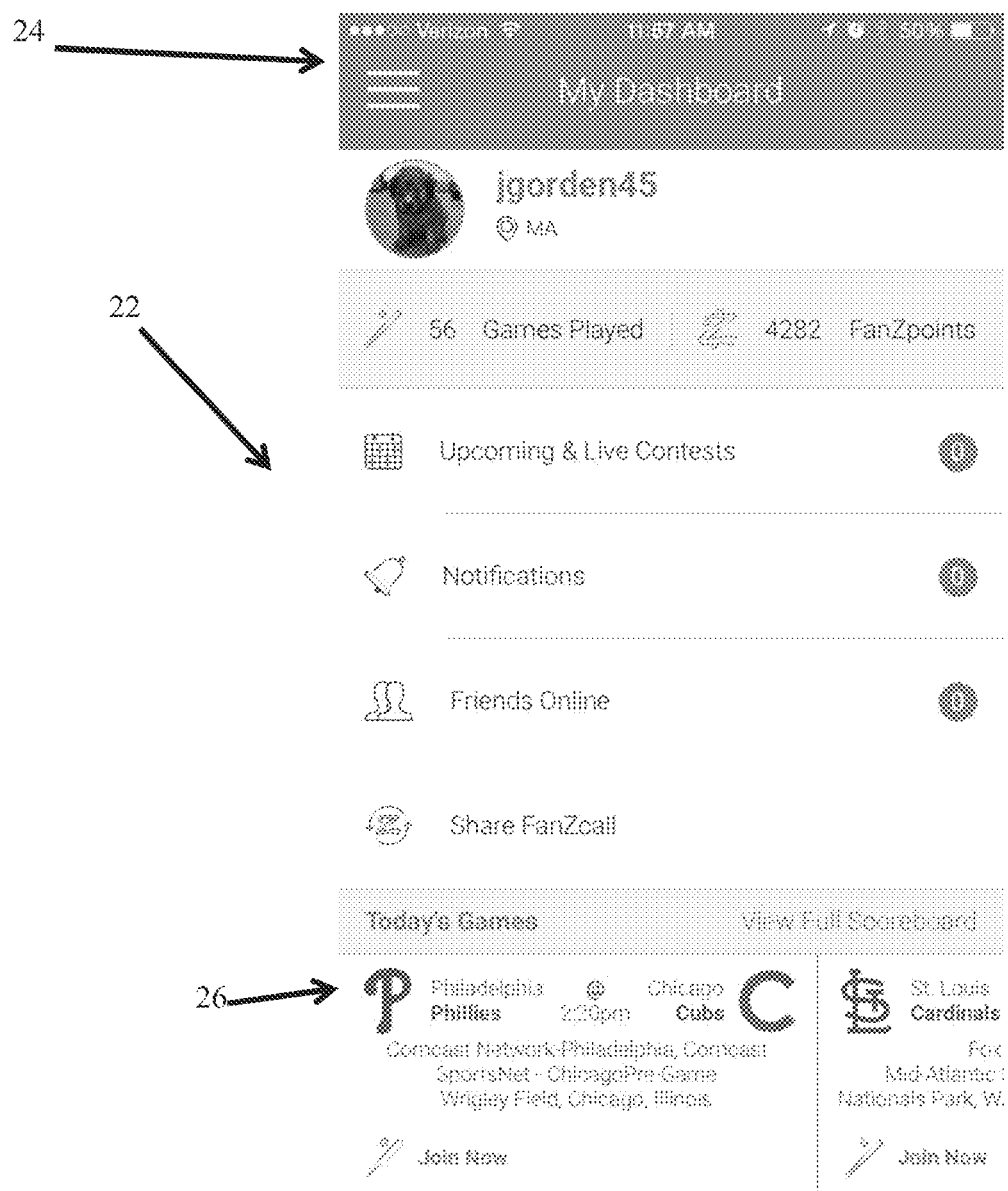
FIG. 4 schematically shows an exemplary screenshot of a dashboard to enable a user to select an event in accordance with illustrative embodiments of the invention (Step 302).

Continuing with step 302, when opening the event application, the user may see an opening display 22 on the screen 12, such as that shown in FIG. 4. In this embodiment, the opening user interface has a dashboard 24 for the user, showing a plurality of different fields of information. In this example, the dashboard 24 shows the username "jgorden45," the total number of games played by this user (56 in this case), and the total number of points accumulated during all of those games (4282 points in this case). Accordingly, the user may reflect on their point total as a source of pride, and/or as a means for obtaining benefits, such as the noted sponsor gift cards, special recognition, etc.

The dashboard 24 also has a upcoming game field 26 listing games in which the user may participate using this event application. The user may slide this upcoming game field 26 to the left or right to select from a plurality of different game options. In this example, this field displays a baseball game between the Philadelphia Phillies and the Chicago Cubs at 2:20 pm on the current day. The user thus may choose this game, or another game, by selecting the hyperlink "Join Now," which sends a request to the event application to interact with the user based upon that specifically selected game.

Figure 5:
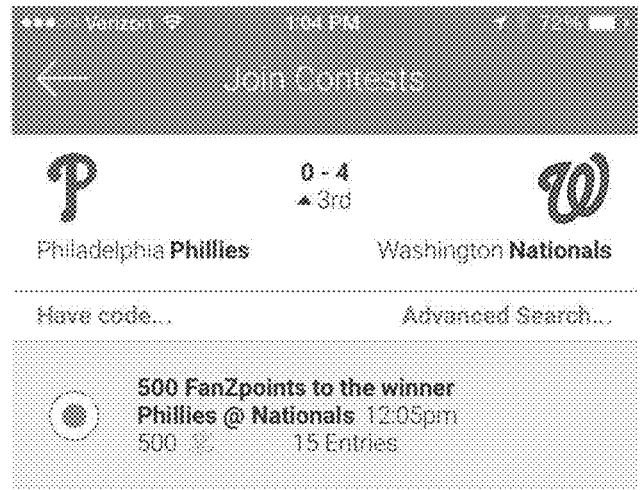
FIG. 5 schematically shows an exemplary screenshot enabling a user to join an event in accordance with illustrative embodiments of the invention (step 304).
Figure 5:
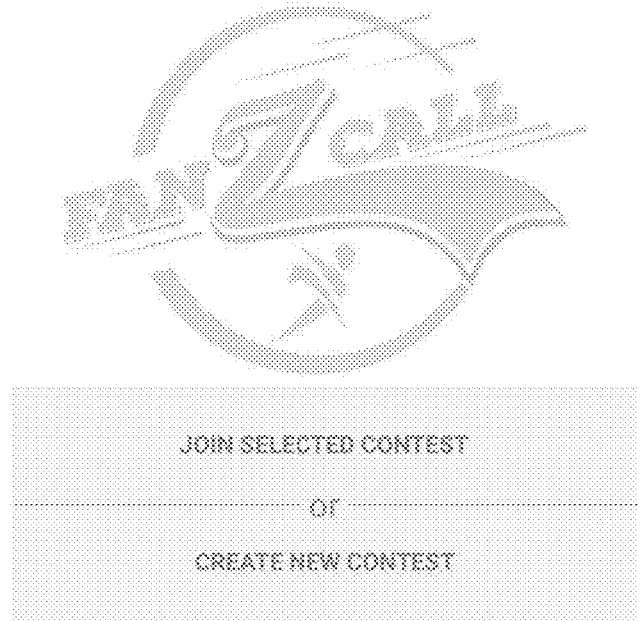

Accordingly, after receiving the game selection (step 304), the event application displays an intermediate selection user interface 28, such as that shown in FIG. 5. Using this interface 28, the user may confirm that they desire to use the event application with the specific game listed in a joining field 29. In this example, the user may select "JOIN SELECTED CONTEST" to use the event application with the game between the Philadelphia Phillies and the Washington Nationals. In this case, the game already is underway, at the top of the third inning, with 15 current users. Continuing with this example, the user with the highest point total at the end of the game receives 500 bonus points (referred to in this example as "FanZpoints").

Figure 6:
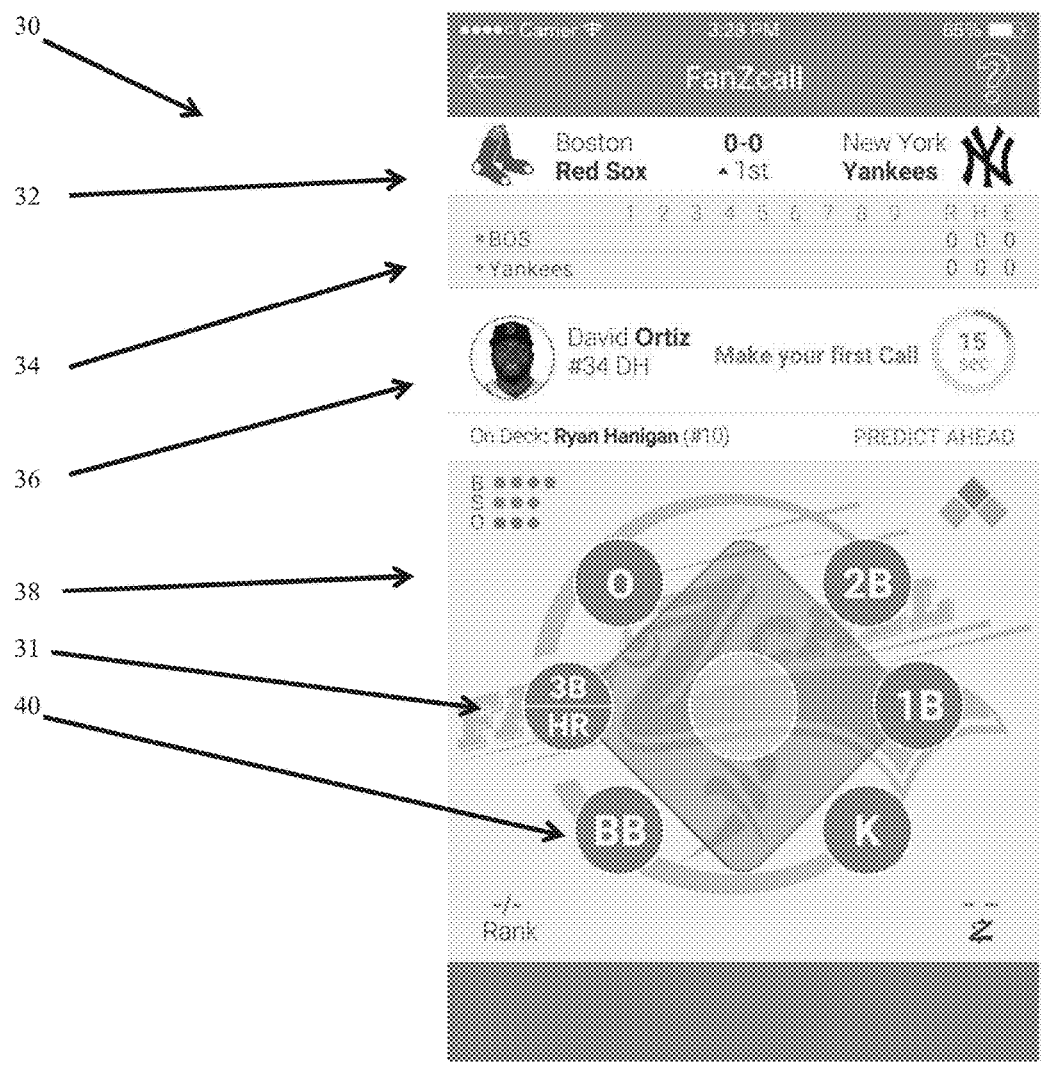
FIG. 6 schematically shows an exemplary screenshot of an event game interface having a user interface for entering selections in accordance with illustrative embodiments of the invention (steps 306, 308, and 314).

After selecting the appropriate game, the event application displays a game interface 30 as shown in FIG. 6, and begins receiving input information (step 306). In this example, the Boston Red Sox are playing the New York Yankees. It should be noted that to arrive at the game interface 30 of FIG. 6 showing this specific game (i.e., in this case, the Boston Red Sox versus the New York Yankees), the user should have selected this game in the corresponding previous user interfaces of FIGS. 4 and 5. Accordingly, even though the examples in FIGS. 4 and 5 show different games, to arrive at the game interface 30 of FIG. 6, the user should have selected the game shown in FIG. 6.

This game interface 30 has a plurality of different fields in different parts of the screen 12. For example, in this case, the different fields include:
  a team field 32 identifying the two teams, the score, and the inning,
  a scoreboard field 34 showing the number of runs, hits, and errors,
  a player field 36 identifying the player up to bat, the player that is on deck, and the amount of time left to make a prediction of what the player will do during their current at bat,
  a prediction field 38 enabling the user to predict the results of the current at bat, identifying the balls and strikes against the batter, the number of outs, players on base, and the point ranking of the user against the other users.

Note that the information in the figures is for illustrative purposes only. For example, some of the information in the team field 32 and scoreboard field 34 of the figures may not be consistent. For example, for the same at-bat, the team field 32 may show different innings across different figures. It nevertheless is reiterated that such figures are for illustrative purposes only.

The prediction field 38 has an event user interface 40 with various graphical indicia permitting the user to predict the outcome of the current player's at-bat. In this example, the event user interface 40 roughly is in the shape of a baseball diamond and has various prediction outcomes for the user to select. Rotating clockwise, the user can select one of the following prediction outcomes: a strikeout ("K"), a single ("1B"), a double ("2B"), and out ("O"), a triple or home run ("3B/HR"), or a walk ("BB").

Accordingly, at this stage, the input 18 of the display system 14 may begin receiving input information. In this example, the input 18 may receive user input from the prediction field 38 and its event user interface 40; i.e., the prediction of the user. In addition, the input 18 may receive machine readable, real-time event information relating to the game. In this case, that information may include any of the information to populate the various fields of the game interface 30. Specifically, the batter information, the balls and strikes, the score, etc., and any other information required by the event application. The event application thus uses this information to display various game facts in the various fields of the game interface 30. The message controller 20 receives this information, via the input 18, to control the display of message indicia (a message 31) in the prediction field 38.

Specifically, before the user has made a prediction, the message controller 20 displays the noted message 31 in the background of the prediction field 38 (step 308). To highlight this, FIG. 6 shows an example of the message 31 in the background of the prediction field 38 of the game interface 30. Some embodiments, however, may extend the message 31 to other fields of the game interface 30. In this case, the message 31 includes the words "FANZCALL" and a stylized logo. Of course, those skilled in the art can use any of a wide variety of types of messages, including words, pictures, and other graphical indicia. For example, the message 31 can include information relating to any of a variety of things, such as an advertisement from some company or organization, or information about the game (e.g., a history of the teams or the background of the current batter). As another example, the message 31 can include information from a third party, (e.g., a friend saying where to meet after the game, or an important safety warning from the National Weather Service about an impending thunderstorm). As such, the message 31 may include incoming text from an instant message, SMS message, electronic mail, or other data source. In illustrative embodiments, a remote computing device may serve and/or control the content of the message.

As background indicia and shown in FIG. 6, the event user interface 40 is in the foreground of the prediction field 38/screen 12, covering portions of the message 31. The message 31 thus has some level of translucence or transparency, enabling the user to see it at this stage without it covering the event user interface 40. Other embodiments, however, may permit the message 31 to be completely opaque, but still be in the background and at least partly covered by the event user interface 40. Alternative embodiments to not show the message 31 at all during this stage. Instead, in these alternative embodiments, the message 31 is not even in the background of the screen 12 before the user is made a prediction.

Figure 7:
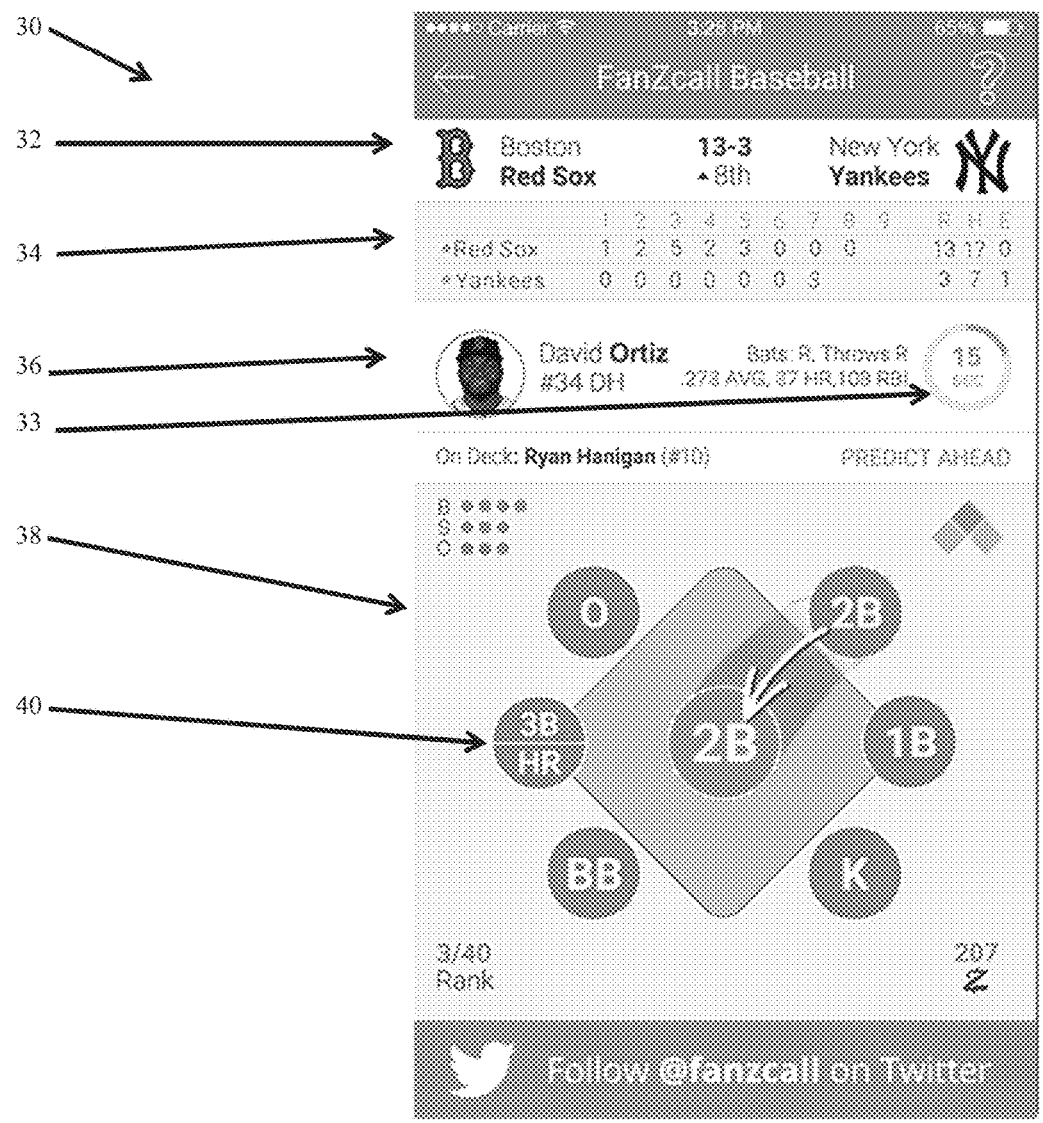
FIG. 7 schematically shows an exemplary screenshot showing a user making a prediction of an activity and with the message in the background in accordance with illustrative embodiments of the invention (step 310).

The process continues to step 310, in which the input 18 receives a prediction from the user. FIG. 7 schematically shows one way of making this prediction, in which the user drags the icon of the selected prediction into the center of the diamond of the prediction field 38. Of course, those skilled in the art can use any of a number of different ways to select the prediction and thus, FIG. 7 is merely an example of one way to make the prediction. In this example shown in FIG. 7, the message 31 is not on the screen 12 at this time. Other embodiments may include the message 31 in the background at this time.

To ensure that the prediction is not made with knowledge of the actual outcome of the given action, the prediction preferably is made before the end of the given action—before the outcome is known. For example, FIG. 7 uses a timer 33 to limit the amount of time that a user may make a prediction. The timer preferably expires before the end of the event (an at-bat in this example). In preferred embodiments, the timer preferably expires before the beginning of the event/at-bat.

In other words, the at-bat has a duration—the time extending from the beginning of the player's at-bat (e.g., the first pitch), until the player completes his/her at-bat. The input 18 thus preferably receives the user's selection before the completion of the at bat (preferably before the first pitch to that player, although it could be after the first pitch). Of course, this duration is specifically determined by the stream of machine readable, real-time event information received by the input 18. Accordingly, the message controller 20 uses that stream of machine-readable information, in real time, to determine the amount of time that the user may have to make a prediction.

The message controller 20 thus sets the timer 33 to an appropriate start time at an appropriate moment during or before the at-bat. For example, the stream of machine-readable information may indicate that a previous player just struck out. At that time, the message controller 20 may set the timer to an amount of time in which the user can reasonably predict the outcome of the next player's at-bat (e.g., 30 seconds), and start the timer. This time preferably expires early enough to ensure that the prediction is made before that next player has started batting—or before the player has completed his/her current at-bat. Preferably, the message controller 20 sets the time to expire before the first pitch to that player. Due to the dynamic nature of the game, however, in rare instances, time may expire after the first pitch. In either case, the duration of the at-bat preferably has not expired (i.e., the player has not completed the at bat before the timer expires).

Figure 8:
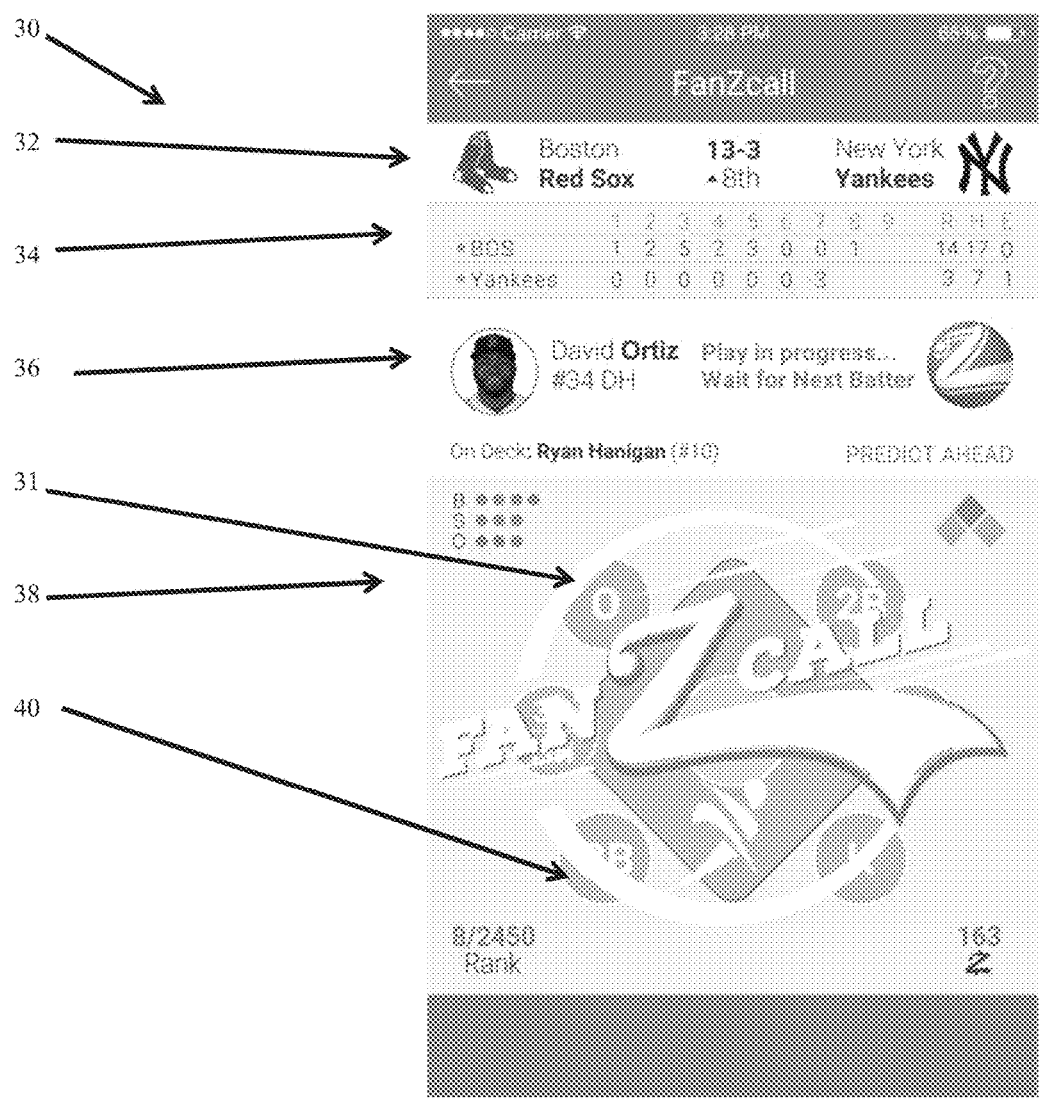
FIG. 8 schematically shows an exemplary screenshot of a message locked in place in the foreground covering at least a portion of the event user interface in accordance with illustrative embodiments of the invention (step 312).

After receiving the prediction, the process continues to step 312, in which the event application displays the prediction on the screen 12. At this point, the prediction cannot be changed. Other embodiments, however, may permit the user to change their prediction under prescribed circumstances. In addition, the message controller 20 also displays the message 31 in the foreground of the screen 12. To that end, FIG. 8 schematically shows the prediction field 38 of the game interface 30 at this time. As shown, the event user interface 40 now is in the background, while the message 31 is in the foreground. This should have no appreciable impact on the user experience since the event user interface 40 has no use during this time. Accordingly, the message 31 covers some or all of the indicia of the event user interface 40. In other words, the message 31 preferably is opaque. In other embodiments, however, the message 31 may have some degree of transparency or translucence. It should be noted that while FIG. 8 shows the message 31 in the event user interface 40 only, other embodiments may display the message 31 over one or more other fields of the game interface 30.

During the at-bat of the current player (in this example, the player having an at-bat is David Ortiz), the message controller 20 locks the message 31 in the foreground of the screen 12. It should be noted that the game interface 30 of this embodiment has no buttons or other user interface to control this portion of the screen 12 at this time. Instead, the message controller 20 controls when and whether the message 31 is in the foreground. The user therefore has no means or mechanism to remove the message 31 from the foreground.

The message controller 20 locks the message 31 in place in the foreground for a prescribed time period. In preferred embodiments, the message controller 20 locks the message 31 in the foreground for a time period based on the remaining duration of the player's at-bat—in this example, from about the time the message controller 20 receives the prediction until the end of the current player's at-bat. Locking the message 31 in place over this active portion of the screen 12 ensures that the user likely will see the message 31.

Moreover, as noted above, the user experience should not be adversely affected by locking it in place because this portion of the user interface is not usable until the end of the players at bat. Rotating the message 31 from the background of the foreground based upon the duration of the player's at bat therefore efficiently uses screen space without interfering with the use and enjoyment of the event application. Specifically, the inventor's recognition that rotating or displaying the message 31 in the foreground during times when a specified portion of the user interface is unusable effectively/logically enlarges the available real estate on the screen 12. This ensures that the user, with even a brief glance, likely will see the message 31 on the screen 12.

At the appropriate time, such as when the player's at-bat ends, the message controller 20 returns the message 31 to the background of the prediction field 38, or simply removes it from the screen 12 (step 314). Accordingly, the screen 12 may return to its state as shown in FIG. 6, ending the process.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the flow chart described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A sporting event display system for optimizing the visible area of a display device during a sporting event having a plurality of activities, each activity ultimately having an outcome, the event display system comprising:
   an input to receive input information, the input information including a stream of electronic, machine readable real-time event information relating to the sporting event;
   a display operatively coupled with the input, the display being configured to display, in real time when receiving the stream of real-time event information, an event user interface having selection indicia, the selection indicia being configured to enable a user to predict in real time the outcome of at least one of the plurality of activities of the sporting event,
   the input information also including a user selection of the selection indicia predicting the outcome of a given activity of the sporting event, the given activity having a duration, the user selection being received before the completion of the given activity as defined by the received stream of real-time event information; and
   a message controller operatively coupled with the display, the message controller being configured to control the display of message indicia in real time during the given activity and, responsive to the input receiving the user selection, the message controller causing the message indicia to cover at least a portion of the event user interface for a time period, the time period being a function of the duration remaining of the given activity after receiving the user selection, the duration being a function of the received stream of real-time event information,
   the message controller further being configured to control the display, as a function of the duration of the given activity, to no longer display the message indicia over at least the portion of the event user interface.

2. The sporting event display system as defined by claim 1 wherein the display device has a foreground and a background, the message controller displaying the message indicia in the foreground of the display device when displayed over at least the portion of the event user interface.

3. The sporting event display system as defined by claim 2 wherein the message controller is configured to display the message indicia in the background before receiving the user selection and after the duration.

4. The sporting event display system as defined by claim 1 wherein the sporting event is a football game or a baseball game.

5. The sporting event display system as defined by claim 1 wherein the sporting event is a baseball game and the given activity as an at-bat of a player of the baseball game.

6. The sporting event display system as defined by claim 1 wherein the controller locks at least a portion of the event user interface when the message indicia is displayed to cover at least the portion of the event user interface, the user having no input means to remove the message indicia from display.

7. The sporting event display system as defined by claim 1 wherein the stream of real-time event information is received live or delayed by no more than about 45 seconds from live.

8. The sporting event display system as defined by claim 1 wherein the message indicia covers at least the portion of the event user interface for the entire remaining duration of the given activity remaining after receiving the user selection.

9. The sporting event display system as defined by claim 1 wherein the display device has a plurality of display regions, the event user interface being one of the plurality of display regions, the message indicia covering no display region other than the portion of the event user interface.

10. The sporting event display system as defined by claim 1 wherein the display device comprises a smartphone or a tablet.

11. The sporting event display system as defined by claim 1 wherein the at least a portion of the event user interface includes the selection indicia.

12. A method of optimizing the visible area of a display device during a sporting event having a plurality of activities, each activity ultimately having an outcome, the method comprising:
receiving a stream of electronic, machine readable real-time event information relating to the sporting event;
displaying, on the display device in real time when receiving the stream of real-time event information, an event user interface having selection indicia, the selection indicia being configured to enable a user to predict the outcome of at least one of the plurality of activities of the event in real time;
receiving a user selection of the selection indicia predicting the outcome of a given activity of the sporting event, the given activity having a duration, the user selection being received before the completion of the given activity as defined by the received stream of real-time event information;
in response to receiving the user selection, displaying, on the display device in real time during the given activity, message indicia over at least a portion of the event user interface for a time period, the message indicia covering at least the portion of the event user interface, the time period being a function of the duration remaining of the given activity after receiving the user selection, the duration being a function of the received stream of real-time event information; and
controlling the display to no longer display the message indicia over at least the portion of the event user interface as a function of the duration of the given activity.

13. The method as defined by claim 12 wherein the display device has a foreground and a background, the message indicia being in the foreground of the display device when displayed over at least the portion of the event user interface.

14. The method as defined by claim 13 further comprising:
displaying the message indicia in the background before receiving the user selection.

15. The method as defined by claim 12 wherein the sporting event is a football game or a baseball game.

16. The method as defined by claim 12 wherein the sporting event is a baseball game and the given activity as an at-bat of a player of the baseball game.

17. The method as defined by claim 12 wherein when the message indicia is displayed to cover at least the portion of the event user interface, the user has no interface to remove the message indicia from display.

18. The method as defined by claim 12 wherein the stream of real-time event information is received live or delayed by no more than about 45 seconds from live.

19. The method as defined by claim 12 wherein the message indicia covers at least the portion of the event user interface for the entire remaining duration of the given activity remaining after receiving the user selection.

20. The method as defined by claim 12 wherein the display device has a plurality of display regions, the event user interface being one of the plurality of display regions, the message indicia covering no display region other than the portion of the event user interface.

21. The method as defined by claim 12 wherein the display device comprises a smartphone or a tablet.

22. The method of claim 12 further comprising displaying information regarding events occurring in the sporting event at a time delayed from times at which the events occur in the sporting event, an amount of the time delay determined based on a location of a user of the display device.

23. The method of claim 12 further comprising:
assigning different predetermined amounts of points to different of the outcomes of the plurality of activities; and
awarding an amount of points assigned to an outcome selected by a user to the user responsive to the selected outcome occurring.

24. A computer program product for use on a computer system for optimizing the visible area of a display device during a sporting event having a plurality of activities, each activity ultimately having an outcome, the computer program product comprising a tangible, non-transient computer usable medium having computer readable program code thereon, the computer readable program code comprising:
program code receiving a stream of electronic, machine readable real-time event information relating to the sporting event;
program code for displaying, on the display device in real time when receiving the stream of real-time event information, an event user interface having selection indicia, the selection indicia being configured to enable a user to predict the outcome of at least one of the plurality of activities of the event in real time;
program code for receiving a user selection of the selection indicia predicting the outcome of a given activity of the sporting event, the given activity having a duration, the user selection being received before the completion of the given activity as defined by the received stream of real-time event information;
program code for detecting the user selection and responsively displaying, on the display device in real time during the given activity, message indicia over at least a portion of the event user interface for a time period, the message indicia covering at least the portion of the event user interface, the time period being a function of the duration remaining of the given activity after receiving the user selection, the duration being a function of the received stream of real-time event information; and program code for controlling the display to no longer display the message indicia over at least the portion of the event user interface as a function of the duration of the given activity.

25. The computer program product as defined by claim 24 wherein the display device has a foreground and a background, the message indicia being in the foreground of the display device when displayed over at least the portion of the event user interface.

26. The computer program product as defined by claim 25 further comprising:

program code for displaying the message indicia in the background before receiving the user selection.

27. The computer program product as defined by claim 24 wherein the sporting event is a football game or a baseball game.

28. The computer program product as defined by claim 24 further comprising program code to prevent the user from removing the message indicia from the display.

29. The computer program product as defined by claim 24 wherein the message indicia covers at least the portion of the event user interface for the entire remaining duration of the given activity remaining after receiving the user selection.

30. The computer program product as defined by claim 24 wherein the display device has a plurality of display regions, the event user interface being one of the plurality of display regions, the message indicia covering no display region other than the portion of the event user interface.

* * * * *